(12) United States Patent
Dispenza et al.

(10) Patent No.: US 9,762,779 B2
(45) Date of Patent: Sep. 12, 2017

(54) SHOCK-RESISTANT CAMERA MOUNTING DEVICE AND METHODS OF FORMING THE SAME

(71) Applicant: Dotworkz, San Diego, CA (US)

(72) Inventors: Jace Dispenza, San Diego, CA (US); William Ferris, Bend, OR (US)

(73) Assignee: DOTWORKZ, San Diego, CA (US)

( * ) Notice: Subject to any disclaimer, the term of this patent is extended or adjusted under 35 U.S.C. 154(b) by 0 days.

(21) Appl. No.: 14/512,109

(22) Filed: Oct. 10, 2014

(65) Prior Publication Data

US 2016/0105592 A1    Apr. 14, 2016

(51) Int. Cl.
*H04N 5/225* (2006.01)
*G08B 13/196* (2006.01)

(52) U.S. Cl.
CPC ..... *H04N 5/2252* (2013.01); *G08B 13/19619* (2013.01); *H04N 5/2251* (2013.01)

(58) Field of Classification Search
CPC ............... G08B 13/1963–13/19632; H04N 5/2251–5/2254; G03B 17/561; F16M 13/00–13/06; H05K 5/0213; H05K 7/20–7/2099
See application file for complete search history.

(56) References Cited

U.S. PATENT DOCUMENTS

| | | | |
|---|---|---|---|
| D77,394 S | 1/1929 | Cohen | |
| 1,955,770 A | 4/1934 | Richards | |
| 2,393,851 A | 1/1946 | Wills | |
| 2,446,096 A | 7/1948 | Moore | |
| 2,490,628 A | 12/1949 | Isserstedt | |
| 2,632,773 A | 3/1953 | Robinson | |
| 3,064,547 A | 11/1962 | Humphries | |
| D279,555 S | 7/1985 | Matsuo | |
| 4,645,320 A | 2/1987 | Muelling | |
| 5,045,871 A * | 9/1991 | Reinholdson | 396/6 |
| 5,216,250 A * | 6/1993 | Pellegrino et al. | 250/370.09 |
| 6,097,424 A * | 8/2000 | Zernov et al. | 348/81 |
| 6,407,922 B1 * | 6/2002 | Eckblad et al. | 361/704 |
| D459,674 S | 7/2002 | Razza | |

(Continued)

OTHER PUBLICATIONS

Orion Telescopes and Binoculars, "Orion Telescopes DSLR Camera Cooler", published 2012.*

(Continued)

*Primary Examiner* — Dennis Hogue
(74) *Attorney, Agent, or Firm* — Workman Nydegger

(57) ABSTRACT

Mounting systems and kits for video recording devices, including a housing partially disposed within a suspension element, the suspension element having a mounting bracket connected thereto, and one or more shock-absorbing elements positioned at an interface or disposed at least partially between at least a portion of the housing and the suspension element. The housing can also include one or more thermal management or temperature control elements, including one or more heating elements, cooling elements, thermal conducting elements, heat dissipating elements, and/or ventilation elements. A kit can include a plurality of thermal management elements, including a variety of interchangeable thermal management modules for selectively heating and/or cooling the video recording device.

19 Claims, 11 Drawing Sheets

(56) References Cited

U.S. PATENT DOCUMENTS

| | | | |
|---|---|---|---|
| 6,940,716 B1* | 9/2005 | Korinsky | G06F 1/20 165/121 |
| D581,307 S | 11/2008 | So | |
| D623,682 S | 9/2010 | Volpato | |
| 8,711,223 B2 | 4/2014 | Ellison | |
| D719,605 S | 12/2014 | Dordick | |
| 2006/0226300 A1 | 10/2006 | Shibuya | |
| 2008/0001284 A1* | 1/2008 | Yuen et al. | 257/712 |
| 2009/0244282 A1* | 10/2009 | Eguiguren | 348/148 |
| 2010/0079101 A1* | 4/2010 | Sidman | 318/649 |
| 2011/0221900 A1* | 9/2011 | Reich | 348/144 |
| 2012/0171411 A1* | 7/2012 | Lashmore et al. | 428/114 |
| 2012/0327230 A1* | 12/2012 | Ellison | 348/148 |

OTHER PUBLICATIONS

Pelco, "EH3512/EH3515 Series Enclosure Product Specification", 2011.*

"Hadley-Roma Men's MS3459RA." Found online Dec. 29, 2016 at www.amazon.com. Page dated Feb. 19, 2013. Retrieved from <URL:https://www.amazon.com/Hardley-Roma-MS3459RA-240-Genuine-Rubber/dp/B005EJGRUY>.

"Shutterstock." Found online Dec. 30, 2016 at www.shutterstock.com. Page dated Jan. 8, 2014. Retrieved from <URL: https://tineye.com/search/c5f94e3b24e34a27026daa8edc8e84f48a4f7dddn-pluginver=chrome-1.1.5>.

"Casio G-Shcok: GA-100CF-8A." Found online Dec. 29, 2016 at www.arlojikita.com. Page dated Aug. 22, 2014. Retrieved from <URL:http://web.archive.org/web/20150215061547/http://www.dptwprkz.com/bash/?>.

"Dotowrkz BASH." Found online Dec. 29, 2016 at www.dotworkz.com. Page dated Feb. 15, 2015. Retrieved from <URL: http://web.archive.org/web/20150215061547/http://www.dotworkz.com/bash/?>.

Non-Final Office Action for U.S. Appl. No. 29/527,157 mailed on Feb. 2, 2017.

* cited by examiner

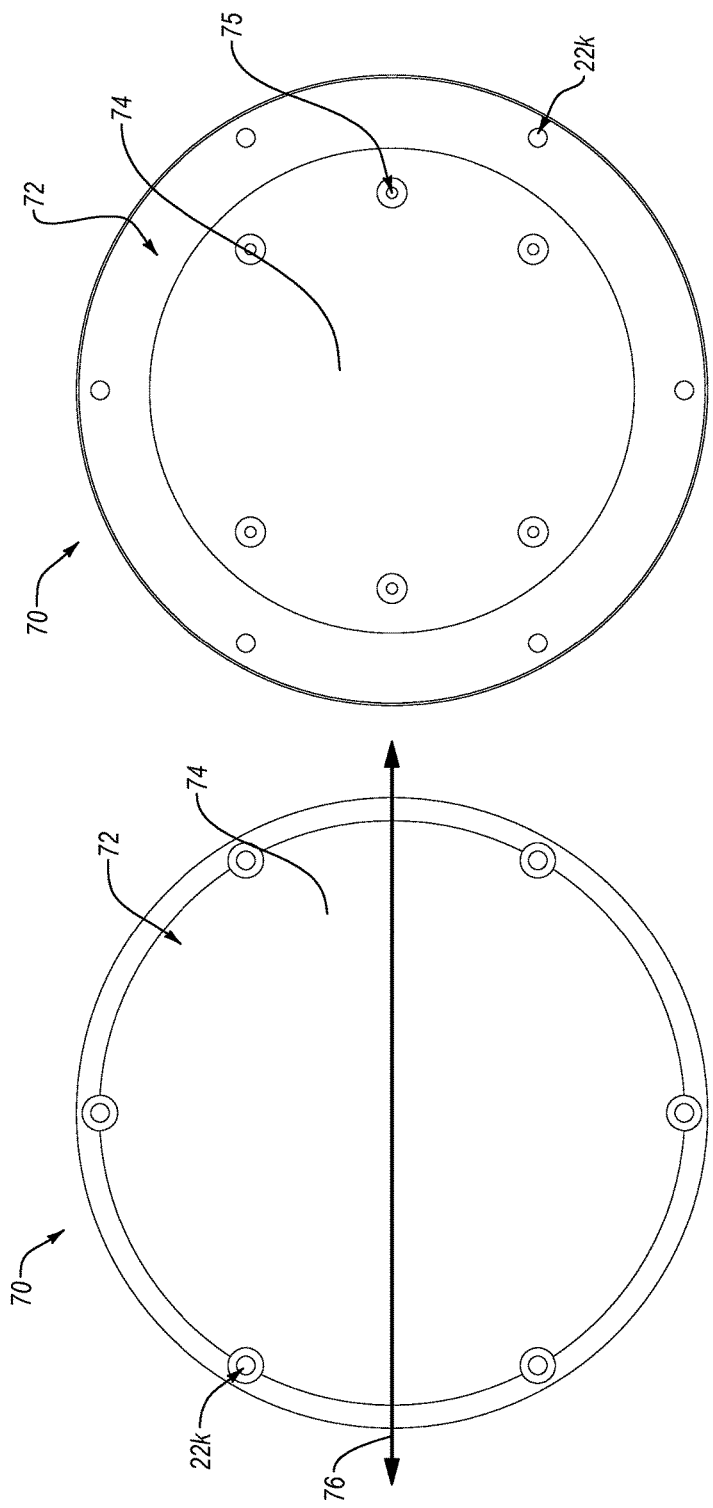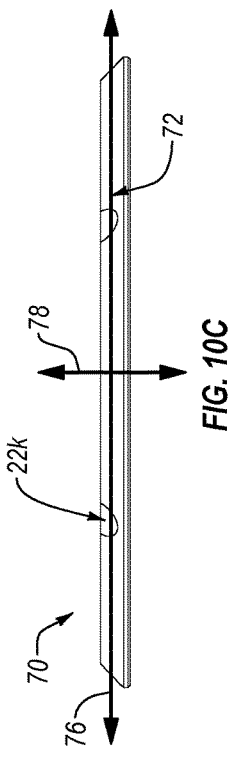

SHOCK-RESISTANT CAMERA MOUNTING DEVICE AND METHODS OF FORMING THE SAME

CROSS-REFERENCE TO RELATED APPLICATIONS

N/A.

BACKGROUND

1. Technical Field

The present disclosure relates generally to camera accessories, including vibration- and/or shock-resistant mounting devices and apparatus. More specifically, the present disclosure relates to systems, methods, and apparatus for mounting a camera under suspension to reduce the amount of vibration or shock to which the camera is exposed.

2. Background and Relevant Art

Recent trends in video recording include capturing extreme or intense activities that involve a high level of shock or vibration. Indeed, entire industries and cult-like followings have developed around extreme sports and activities. Various camera mounting systems permit modern cameras to be attached or connected to a variety of support structures, including vehicles, devices, animals, and people. These mounting support structures may then be exposed to intense movements or motions, including jarring, jolting, shaking, shocking, rocking, bouncing, bumping, thumping, and intense vibrations during the extreme activities.

The high level of force (e.g., G-force, impact, etc.) to which the camera is exposed may partially or entirely disrupt the desired video feed and may even damage or destroy the camera. For instance, intense vibrations can cause jitters in the video feed, reducing the quality of the video on playback. Large jolts or bumps can kill the video feed altogether, ruining a once-in-a-lifetime opportunity to capture the perfect video. Even small impacts can damage sensors and other electronic components of the camera equipment, and large impacts can entirely destroy a camera used in extreme activities.

Moreover, even a continuous, otherwise undisrupted video feed can be ruined by bouncing of the camera during recording. While certain extremist prefer the home video or budget documentary look and feel of extreme activities, other video enthusiast prefer a smooth video feed that is substantially free of jolting camera movements. While rigidly mounted or attached camera mounting systems are available for the jolt-jockey extremists, an affordable and effective solution to bouncing cameras is lacking in the art. Complex spring-, gyroscope-, pendulum-, and/or gimbal-containing systems, for instance, are expensive and difficult to install and maintain. In addition, existing systems cannot be rotated and secured in place to capture video in other than a single, pre-determined direction or orientation relative to the structure to which they are attached. Similarly, existing systems are not configured to provide impact or vibration protection in a plurality of orientations.

In addition to the foregoing, camera equipment mounted within housings of known mounting systems may be exposed to other harsh physical conditions, including high and low temperature extremes. Cameras exposed to the elements can overheat in high temperatures and freeze in low temperatures. In some cases, conditions can change from extreme high temperature environments to extreme low temperature environments without adequate and/or advanced warning. Thus, camera operators are at a disadvantage when it comes to thermal management of cameras in known mounting systems.

Accordingly, there are a number of disadvantages in conventional camera-mounting systems that can be addressed.

BRIEF SUMMARY

Implementations of the present disclosure overcome or solve one or more of the foregoing or other problems in the art with systems, methods, and apparatus for mounting a video recording device, including vibration- and/or shock-resistant mounting systems, methods, and apparatus. Some implementations include one or more mounting elements for mounting a video recording device under suspension to reduce the amount of vibration or shock to which the video recording device is exposed. For instance, an exemplary mounting system can include a housing partially disposed within a suspension element, the suspension element having a mounting bracket connected thereto. In certain implementations, one or more shock-absorbing elements can be positioned at an interface or disposed between at least a portion of the housing and the suspension element.

Some implementations of the present disclosure can include one or more thermal management elements, including one or more heating elements, cooling elements, thermal conducting elements, heat dissipating elements, and/or ventilation elements. Certain implementations can include a kit comprising a plurality of thermal management elements, including a variety of interchangeable thermal management modules for selectively heating and/or cooling the video recording device.

Additional features and advantages of exemplary implementations will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, example implementations will be described and explained with additional specificity and detail through the use of the accompanying drawings in which:

FIG. 10A illustrates a facing view of a temperature control element of the mounting system of FIG. 1A;

FIG. 10B illustrates a rear facing view of the temperature control element of FIG. 10A; and FIG. 10C illustrates a side view of the temperature control element of FIG. 10A.

DETAILED DESCRIPTION

Figure 1A:
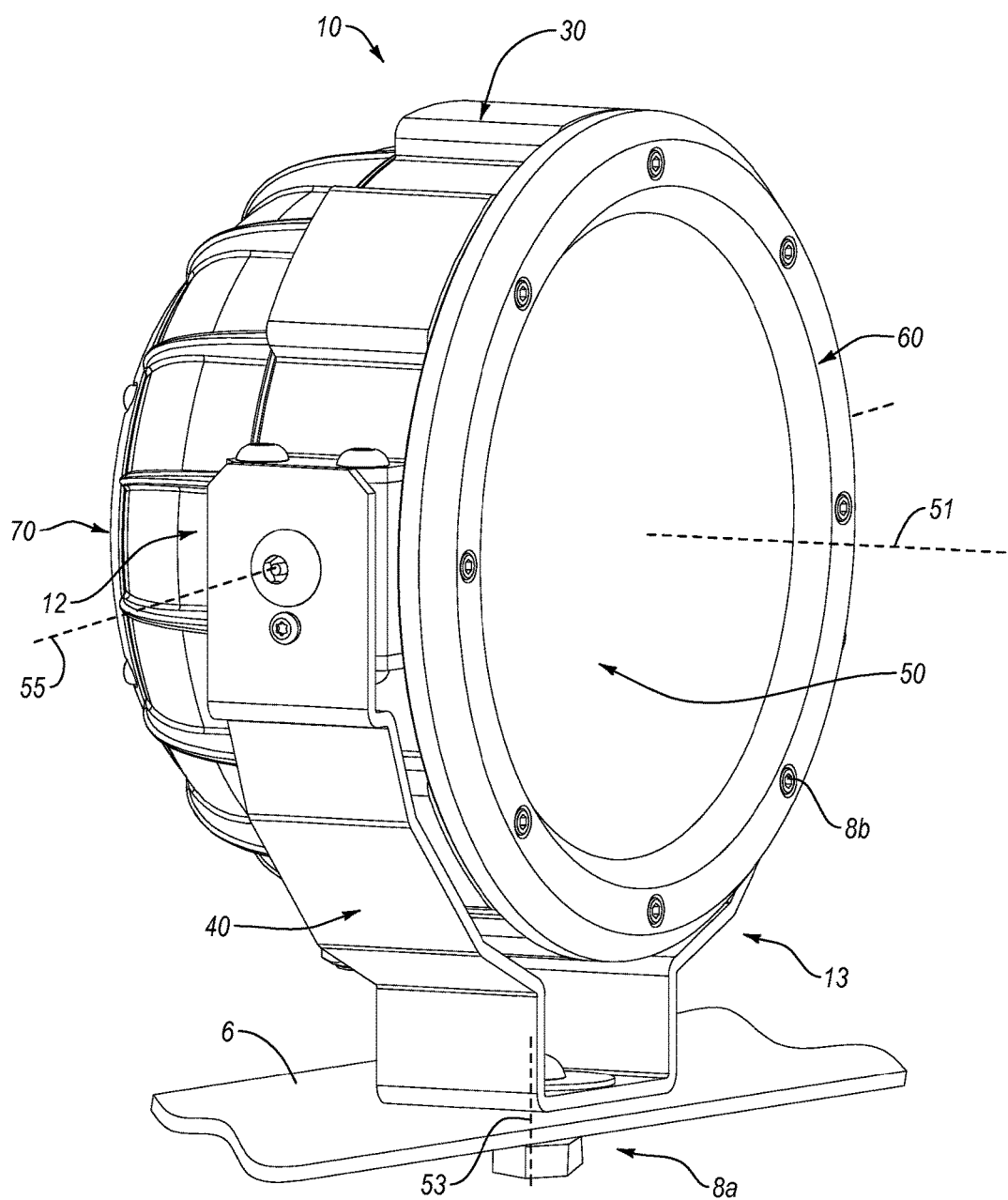
FIG. 1A illustrates a front perspective view of a mounting system in accordance with an implementation of the present disclosure.

The present disclosure extends to systems, methods, and apparatus for mounting a video recording device, including vibration- and/or shock-resistant mounting systems, methods, and apparatus. Some implementations include one or more mounting elements for mounting a video recording device under suspension to reduce the amount of vibration or shock to which the video recording device is exposed. For instance, an exemplary mounting system can include a housing partially disposed within a suspension element, the suspension element having a mounting bracket connected thereto. In certain implementations, one or more shock-absorbing elements can be positioned at an interface or disposed between at least a portion of the housing and the suspension element.

Some implementations of the present disclosure can include one or more thermal management elements, including one or more heating elements, cooling elements, thermal conducting elements, heat dissipating elements, and/or ventilation elements. Certain implementations can include a kit comprising a plurality of thermal management elements, including a variety of interchangeable thermal management modules for selectively heating and/or cooling the video recording device.

As used herein, the term "comprising," which is synonymous with "including," "containing," or "characterized by," is inclusive or open-ended and does not exclude additional, un-recited elements or method steps.

It will be noted that, as used in this specification and the appended claims, the singular forms "a," "an," and "the" include plural referents unless the content clearly dictates otherwise. Thus, for example, reference to "a movement-generating element" includes one, two, or more movement-generating elements.

As used in the specification and appended claims, directional terms, such as "top," "bottom," "left," "right," "up," "down," "upper," "lower," "proximal," "distal," "front," "rear," and the like are used herein solely to indicate relative directions and are not otherwise intended to limit the scope of the disclosure or claims.

Where possible, like numbering of elements have been used in various figures. Furthermore, multiple instances of an element and or sub-elements of a parent element may each include separate letters appended to the element number. For example, two instances of a particular element "32" may be labeled as "32a" and "32b". In that case, the element label may be used without an appended letter (e.g., "32") to generally refer to instances of the element or any one of the elements. Element labels including an appended letter (e.g., "32a") can be used to refer to a specific instance of the element or to distinguish or draw attention to multiple uses of the element.

Furthermore, an element label with an appended letter can be used to designate an alternative design, structure, function, implementation, and/or embodiment of an element or feature without an appended letter. Likewise, an element label with an appended letter can be used to indicate a sub-element of a parent element. For instance, an element "44" can comprise sub-elements "44a" and "44b."

Various aspects of the present devices and systems may be illustrated by describing components that are coupled, attached, and/or joined together. As used herein, the terms "coupled," "attached," and/or "joined" are used to indicate either a direct connection between two components or, where appropriate, an indirect connection to one another through intervening or intermediate components. In contrast, when a component is referred to as being "directly coupled," "directly attached," and/or "directly joined" to another component, there are no intervening elements present. Furthermore, as used herein, the terms "connection," "connected," and the like do not necessarily imply direct contact between the two or more elements.

Various aspects of the present devices, systems, and methods may be illustrated with reference to one or more exemplary embodiments. As used herein, the term "exemplary" means "serving as an example, instance, or illustration," and should not necessarily be construed as preferred or advantageous over other embodiments disclosed herein.

Unless defined otherwise, all technical and scientific terms used herein have the same meaning as commonly understood by one of ordinary skill in the art to which the present disclosure pertains. Although a number of methods and materials similar and/or equivalent to those described herein can be used in the practice of the present disclosure, example materials and methods are described herein.

One or more elements included in implementations of the present disclosure can comprise a metal or metal alloy. For instance, metal or metal alloy materials can include, but are not limited to, aluminum, iron, steel, cobalt, titanium, and/or any other suitable metal or metal alloy. In addition, certain implementations can include elements comprising a metal blend. For instance, certain materials may include a mixture of metal, metal alloy, polymeric material, gelatinous material, inert material, glass, silicon, and/or any other material suitable for blended combination.

One or more elements included in implementations of the present disclosure can comprise a polymeric material such as plastic and/or resin. For instance, exemplary polymeric materials can include, but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), and/or the like, including combinations thereof. Furthermore, the polymeric material can include other thermoplastic polymers or thermoplastic polymer blends, or combinations and mixtures thereof, including any number of layers and/or coatings.

In at least one implementation, certain polymeric materials can have one or more advantages over metal or metal alloy materials. For instance, certain polymeric materials can be corrosion-resistant, non-corrosive, non-porous, water-tight, water-proof, water-resistant, and/or have other desirable qualities.

One or more implementations of the present disclosure include systems, methods, and apparatus for mounting a video recording device under suspension to reduce the amount of vibration or shock to which the video recording device is exposed. Exemplary video recording devices can include digital and/or analogue recording devices, personal video cameras and/or camcorders, security cameras, 360 degree security cameras, 180 degree security cameras, wireless cameras, camera phones and/or handheld camera devices, GOPRO® cameras, and any other device configured to capture, record, transmit, or convey images comprising one or more frames. Thus, as used herein, video recording and similar terms can refer to still-shot, multi-shot, and/or continuous-shot acquiring. For convenience, reference to a "camera" will be made herein. One will appreciate that a camera can comprise any of the video recording devices described above.

Some implementations of the present disclosure can include camera accessories, including vibration- and/or shock-resistant mounting systems and apparatus. For instance, an exemplary camera mounting system can include a housing configured to receive at least part of a camera therein. The housing can be attached to a mounting assembly. The mounting assembly can include a suspension element or bracket configured to receive the housing and a mounting bracket configured to be attached to a support structure (or surface thereof).

In some embodiments, the housing can be at least partially disposed within a suspension element, and the suspension element can have the mounting bracket connected thereto. In at least one embodiment, the suspension element can be rotatably and/or rotationally attached and/or secured (or attachable and/or securable) to the mounting bracket such that the suspension element-bound housing can be rotated about the mounting bracket. For instance, the suspension element can be selectively rotatably about and securable to the mounting bracket such that the orientation of the suspension element-bound housing relative to the mounting bracket can be selectively altered and reversibly fixed. In certain embodiments, the mounting bracket can be rotatably and/or rotationally attached and/or secured (or attachable and/or securable) to the support structure such that the orientation of the camera mounting system relative to the support structure can be selectively altered and reversibly fixed.

In certain implementations, one or more shock-absorbing elements can be positioned at an interface of or disposed between at least a portion of the housing and the suspension element. One will appreciate however that the one or more shock-absorbing elements can also or alternatively be positioned at an interface of or disposed between members of the mounting assembly (e.g., the suspension element and the mounting bracket). In at least one implementation, however, the camera mounting system can include a non-pendulum, non-gimbal, and/or non-coiled-spring suspension system. In particular, the one or more shock-absorbing elements can be devoid of or not include a pendulum, gimbal, and/or coiled spring.

Some implementations of the present disclosure can include a temperature control element (or thermal management element). For instance, in at least one implementation, the temperature control element can comprise a thermally conductive plastic or polymeric material (e.g., a thermally conductive plastic disk that can dissipate heat at a higher rate in an in-plane direction than in a through-plane direction relative to the planar body or configuration of the disk). In other embodiments, and as discussed in further detail below, the temperature control element can comprise a thermoelectric or other device configured to actively cool, actively heat, and/or actively dissipate heat away from the camera mounting system or one or more components thereof.

Figures 1B, 1C:
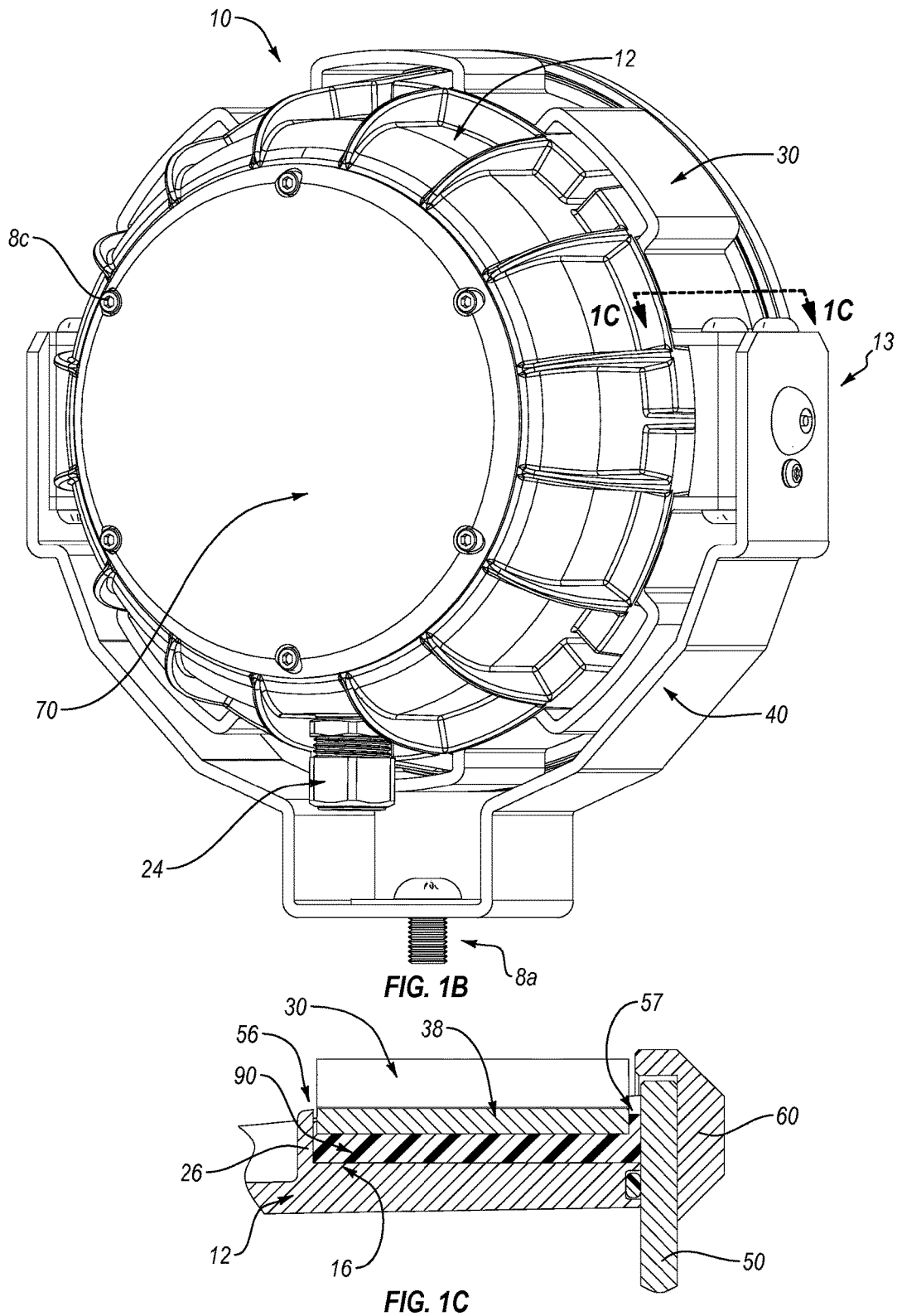
FIG. 1B illustrates a rear perspective view of the mounting system of FIG. 1A.
FIG. 1C illustrates a cross-sectional view of a portion of the mounting system of FIG. 1B along line 1C.

Turning now to the Figures, FIGS. 1A-1B illustrates an exemplary mounting system 10 in accordance with an implementation of the present disclosure. Various elements and/or components of illustrative mounting systems (e.g., mounting system 10) will now be discussed individually in detail. Mounting system 10 can include at least one camera housing 12 at least partially disposed in, received by, attached to, and/or connected to a mounting assembly 13. Mounting assembly 13 can include a suspension element 30 configured to receive or connect to housing 12 at an interface. Mounting assembly 13 can also include a mounting bracket 40 connected to suspension element 30 and which is configured to be secured to a surface, including a surface of a structural body and/or support structure 6 (e.g., via one or more fasteners 8*a*).

One of skill in the art will appreciate that fasteners 8 (e.g., fasteners 8*a*, 8*b*, 8*c*) can comprise any suitable means or mechanisms for fastening disclosed herein or otherwise known in the art. By way of example, fasteners 8 can comprise one or more bolts, screws, clips, clasps, clamps, hooks, nails, pins, posts, washers, lock-washers, adhesives (including tape, glue, or other means for adhering), and/or other devices or mechanisms for fastening, attaching, and/or connecting two or more elements. A variety of fasteners 8, including a plurality of types of fasteners 8, can be provided and/or included in connection with various elements of system 10, including housing 12 and/or mounting assembly 13 thereof. Fasteners 8 can also comprise a metal, metal alloy, or polymeric material, and/or other suitable material, including combinations or blends thereof.

As illustrated in FIG. 1A, housing 12 can comprise a partially or substantially dome-shaped body. One will appreciate, however, that housing 12 can comprise any suitable shape or configuration, including circular, spherical, oval, square, rectangular, triangular, pentagonal, hexagonal, and/or any other geometric or rounded shape, including combinations thereof. Housing 12 can include angular and/or rounded features, components, and/or elements, including corners, edges, lips, ridges, sides, faces, etc. Housing 12 can also comprise a metal, metal alloy, or polymeric material, and/or combination or blend thereof.

Figure 2:
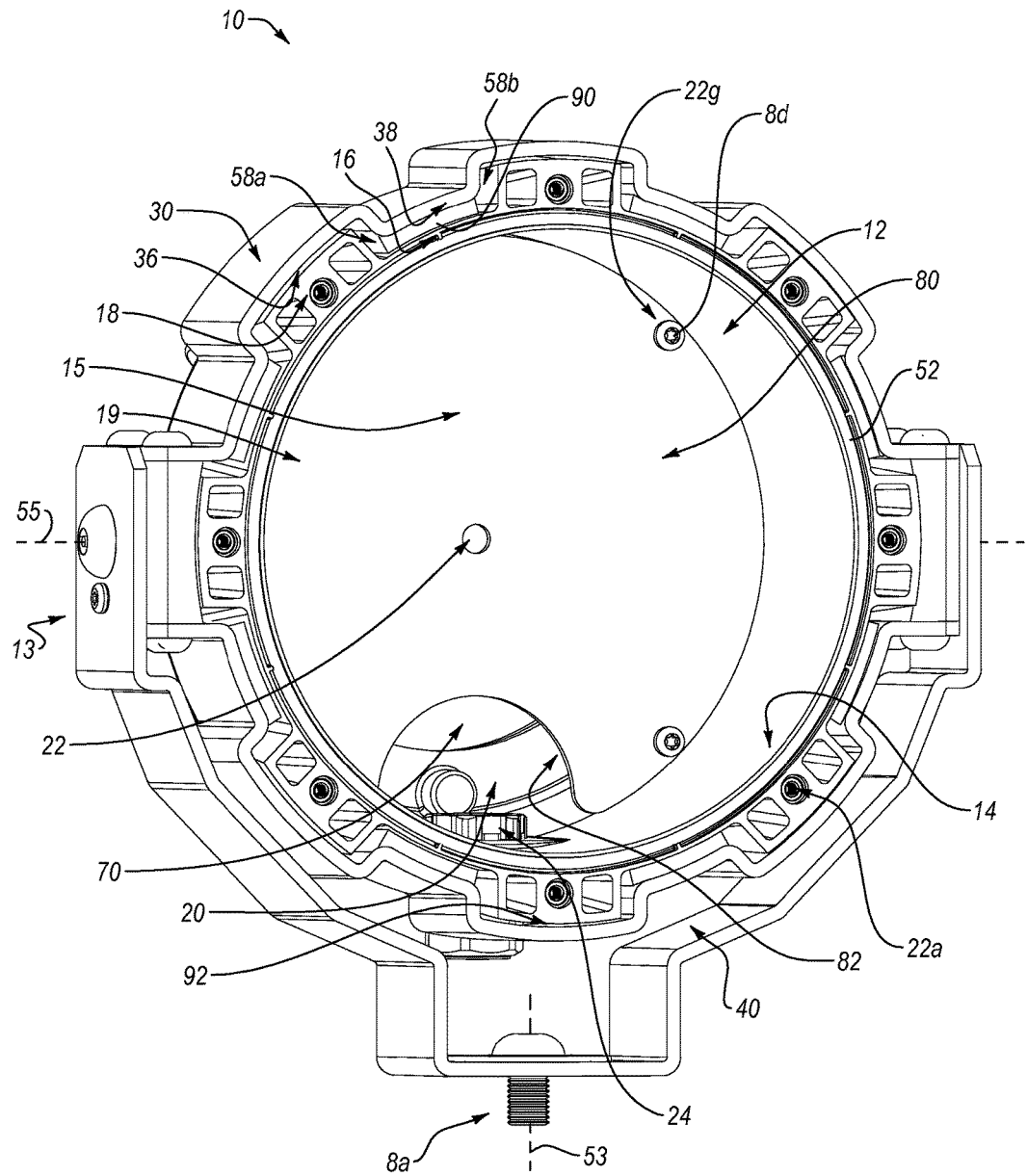
FIG. 2 illustrates the mounting system of FIG. 1A in an open configuration.

Mounting system 10 can also include a cover (or covering) 50 and cover securing element 60 connected to the front or face of housing 12 and/or mounting assembly 13 (e.g., via one or more fasteners 8*b*). As illustrated in FIGS. 1A and 2, covering 50 can cover the optical window or front opening 19 of housing 12 and can have a substantially flat configuration perpendicular to optical axis 51. As known in the art, optical axis 51 can be defined by opening 19 and/or the camera disposed in housing 12. For instance, optical axis 51 can correspond to the line normal the (vertical) plane of opening 19 and/or covering 50 (e.g., the vector perpendicular to the tangent plane of opening 19). One will appreciate, however, that while the structural elements of housing 12 defining or corresponding to opening 19 may define a plane or tangent plane that is not perpendicular to optical axis 51, optical axis 51 can still comprise and/or correspond to the (imaginary) line that defines the path along which light propagates through housing 12 and exits opening 19. Thus, opening 19 can always be oriented in the direction of optical axis 51.

In an alternative embodiment, covering 50 can have a rounded or angled (e.g., convex or concave rounded or angled) configuration. Accordingly, optical axis 51 can comprise the surface normal of covering 50 corresponding to the vector perpendicular to the tangent plane of opening 19. Similarly, covering 50 can (first) protrude away from (or sink/depress into) housing 12 (e.g., and then flatten, round, or angle off).

As illustrated in FIG. 1A, optical axis 51 can be (oriented) parallel to the tangent line or plane of support surface 6 (e.g., at the point attachment of fastener 8a). One will appreciate, however, that the angle between optical axis 51 and the tangent line or plane of support surface 6 need not be parallel in some implementations of the present disclosure. For instance, in at least one implementation, housing 12 and/or suspension element 30 (e.g., suspension element-bound housing 12) can be pivoted (up to 360 degrees) about mounting bracket 40 (e.g., about suspension axis 55). Accordingly, the angle between optical axis 51 and the tangent line or plane of support surface 6 can be 0 degrees (parallel), 90 degrees (perpendicular), and/or any value or range of values therebetween. In some implementations, mounting system 10 and/or one or more components thereof can be operable (as intended) in any orientation between and/or including 0 degrees (parallel) and 90 degrees (perpendicular). In other words, mounting system 10 and/or one or more components thereof can be operable (as intended) regardless of the angle between optical axis 51 and the tangent line or plane of support surface 6, in some implementations.

As illustrated in FIG. 1A, covering 50 can be secured, attached, and/or connected to the front of housing 12 (e.g., via fastener(s) 8b). One will appreciate, however, that covering 50 can also or alternatively be secured, attached, and/or connected to another portion of housing 12 and/or to a portion of suspension assembly 13. Covering 50 can comprise transparent, translucent, opaque and/or non-opaque material. Covering 50 can comprise a polymeric or other suitable material described herein and/or known in the art.

As illustrated in FIG. 1B, mounting system 10 can also include a temperature control element (or thermal management element) 70 (e.g., connected to the back or rear of housing 12 and/or mounting assembly 13 via one or more fasteners 8c). For instance, in at least one implementation, temperature control element 70 can comprise a thermally conductive plastic or polymeric material. Specifically, as discussed further below, temperature control element 70 can comprise a thermally conductive plastic disk (e.g., that can dissipate heat at a higher rate in an in-plane direction than in a through-plane direction (e.g., relative to a planar body or configuration thereof)).

In at least one implementation, temperature control element 70 can (actively) cool, (actively) heat, and/or (actively) dissipate heat in one or more directions (and/or can be adapted, configured, and/or operable for, and/or capable of performing the same). For instance, temperature control element 70 can comprise a thermoelectric device configured to actively cool, actively heat, and/or actively dissipate heat away from mounting system 10 or one or more components thereof.

In some implementations, temperature control element 70 can comprise one or more thermoelectric coolers, fans, heating elements, heat generating elements, radiators, heating coils, heat conducting elements, thermally conductive elements, heat dissipating elements, heat extractors, electronic Peltier members, air flow management elements, ventilation elements, cooling elements, cooling modules, cool air ventilating elements, air conditioners, and/or an electronic device that becomes hot on one side a cool on the other when power is applied.

In at least one implementation, "active cooling," "active heating," "active dissipation," and similar terms can refer to activities or results that require an (external) energy input, including electrical, mechanical, and/or other forms of energy. Thus, in at least one implementation, temperature control element 70 can comprise an energy consuming device (e.g., that receives an (external) energy input to accomplish a temperature controlling function). In certain implementations, temperature control element 70 can comprise a solar-powered device. Temperature control element 70 can also or alternatively comprise a device powered by one or more batteries and/or electrical cables. One will appreciate that other forms or wired and wireless power are also contemplated herein.

In some implementations, temperature control element 70 can protect against and/or be protected from solar loading. For instance, the thermal conductivity of the plastic in temperature control element 70 can be engineered to dissipate heat within temperature control element 70 (or the material thereof), while not dissipating heat well through temperature control element 70, thereby protecting a camera disposed within housing 12 from the damaging effects of solar loading.

FIG. 1C illustrates a cross-sectional view of a portion of mounting system 10 along line 1C-1C of FIG. 1B. As illustrated in FIG. 1C, a shock absorbing element 90 can be disposed at least partially between suspension element 30 and housing 12. For instance, shock-absorbing element 90 can be disposed at least partially within an exterior or outer surface recess 16 of housing 12 (e.g., between recess 16 of housing 12 and inner surface protruding element 38 of suspension element 30). In at least one implementation, when suspension element 30 is disposed about, attached to, and/or positioned around housing 12, protruding element 38 of suspension element 30 can squeeze shock-absorbing element 90 into rear gap 56 (between protruding element 38 and barrier ridges 26 of housing 12) and/or into a front gap 57 (between protruding element 38 and cover or covering 50).

In an exemplary embodiment, shock-absorbing element 90 can comprise a foam, polymeric, synthetic, and/or natural padding material (e.g., a yoga mat filling-like material). Other suitable materials for shock-absorbing element 90 can include bed mattress material, including foam, padding, memory foam, gel, fabric or other matrix material(s), and the like. One will appreciate that suitable material for shock-absorbing element 90 can be obtained from other sources as well without departing from the scope of this disclosure.

As illustrated in FIG. 2, shock-absorbing element 90 can be positioned and/or disposed at least partially between recess 16 of housing 12 and protruding element 38 of suspension element 30. Protruding element 38 of suspension element 30 can squeeze shock-absorbing element 90 into side gaps 58 in certain implementations. Accordingly, the clamping force or pressure of suspension element 30 on shock-absorbing element 90 can cause at least a portion of shock-absorbing element 90 to fill at least a portion of side gaps 58, rear gap 56, and/or front gap 57.

Accordingly, (squeezed) shock absorbing element 90 (positioned and/or disposed about or around housing 12) can be configured to at least partially shield, protect, isolate, and/or insulate housing 12 from the full and/or direct impact of a force applied to mounting assembly 13 and/or one or more components thereof. Indeed, shock-absorbing elements 90 can absorb, dissipate, convert, reduce, and/or abrogate one or more forces applied to camera mounting system 10 in any direction in the X, Y, and/or Z planes (or combinations thereof).

Furthermore, (squeezed) shock absorbing elements 90 can shield, protect, isolate, and/or insulate housing 12 from the full and/or direct impact of a force applied to mounting assembly 13 and/or one or more components thereof regardless of the orientation of housing 12 and/or other components of mounting system 10. Thus, camera mounting system 10 (or mounting bracket 40 thereof) can be rotated 360 degrees about the mounting axis 53 (e.g., defined by the axis of fastener 8a) while retaining a level of shock-absorbing effectiveness in any position thereof. Likewise, housing 12 can be pivoted 360 degrees about a suspension axis 55 (e.g., defined by the axis of fastener 8a) and/or within suspension element 30 while retaining a level of shock-absorbing effectiveness in any position thereof.

As illustrated in FIG. 2, the positioning of shock-absorbing elements 90 between and/or at the interface between housing 12 and mounting assembly 13 (e.g., at the interface between housing 12 and suspension bracket 30) can provide, permit, cause, and/or leave a gap 92 between at least a portion of housing 12 and mounting assembly 13 (or suspension element 30 thereof). In at least one implementation, gap 92 can be or comprise between about 1/32" and about 1/2" (or between about 0.8 mm and about 12.7 mm, between about 1/16" and about 1/4" (or between about 1.6 mm and about 6.35 mm), between about 1/12" and about 1/8" (or between about 2.2 mm and about 4.2 mm), between about 1/10" and about 1/8" (or between about 2.54 mm and about 3.2 mm), and/or any amount or range therebetween, including ranges up to, greater than, less than, and/or including the foregoing amounts.

As illustrated in FIG. 2, housing 12 can comprise a receptacle having an inner surface 14 at least partially bounding a chamber or compartment 15. Housing 12 can also have a first opening 19 leading to compartment 15. Those skilled in the art will appreciate that the first opening 19 can define an optical axis and/or can be oriented in the direction of an optical axis (e.g., optical axis 51 of FIG. 1A). For instance, light passing along a vector through compartment 15 of housing 12 can exit the first opening 19 parallel to or along the optical axis. Similarly, the optical axis can be defined by a camera disposed within compartment 15 and oriented with the lens thereof facing opening 19. Thus, as illustrated in FIG. 1A, optical axis 51 can correspond to the line normal the planar covering 50 (or the tangent plane of opening 19).

As illustrated in FIG. 2, housing 12 can be received within the ring-shaped body of suspension bracket 30 without forming certain direct contacts between housing 12 and suspension bracket 30 (e.g., in a resting or un-flexed configuration). Thus, housing 12 can be suspended within and/or under suspension relative to suspension element 30 by means of shock-absorbing elements 90. Accordingly, housing 12 can experience and/or have available a (limited) degree of movement or flexibility within mounting assembly 13. Thus, housing 12 can be isolated from direct impact of force applied to mounting assembly 13, as described further below.

Furthermore, an alternating pattern of interior or inner surface recessed elements 36 and inwardly protruding elements 38 of suspension element 30 can correspond to an alternating pattern of exterior or outer surface raised members 18 and exterior or outer surface recesses 16 about housing 12. Accordingly, housing 12 can be generally, substantially secured, retained, maintained, and/or disposed at least partially within a portion of mounting assembly 13 (or suspension element 30 thereof) while maintaining gaps 92, 56, 57, 58 and/or experiencing and/or having available a (limited) degree of movement or flexibility within mounting assembly 13.

For instance, housing 12 can be captured by the features that are formed during injection molding of housing 12 and suspension element 30 (e.g., raised members 18 and recesses 16 of housing 12 and recessed elements 36 and protruding elements 38 of suspension element 30), while still retaining a limit degree of play or potential movement. In some implementations, because shock-absorbing element 90 is pushed or squeezed into gaps 56, 57, 58, housing 12 can be retained within suspension element 30 while having the potential for movement in the axial direction (z-axis) (normal to the viewing direction) and/or radial direction (x-y plane). Thus, housing 12 can be suspended and/or under suspension relative to and/or within suspension element 30 and/or isolated from direct impact of force applied to mounting assembly 13, as described above.

Illustratively, regardless of orientation in the lateral twisting planes (about the axis of rotation of fastener 8a) and/or longitudinal tilting planes (about the axis of rotation of fastener 8f (see e.g., FIGS. 2 and 7)), shock-absorbing element 90 can cushion and/or absorb at least a portion of a force applied to mounting system 10. For instance, a bouncing motion (up and down), a rocking motion (side to side), and/or, a jerking motion (forward and backward) can all be at least partially cushioned and/or absorbed by shock-absorbing element 90 in various implementations of the present disclosure.

As illustrated in FIG. 2, compartment 15 of housing 12 can comprise a cylindrical shape or configuration. One will appreciate that, like housing 12, compartment 15 can be configured in any suitable shape, including cylindrical, conical, cubical, pyramidal, tubular (square, rectangular, circular, etc.), dome-like, and/or any suitable shape or combination thereof. Compartment 15 can also be configured to receive a camera at least partially disposed therein and/or connected or attached thereto. For example, a camera can be connected to a mounting element 80 via opening 22.

Mounting element 80 can comprise a rigid, semi-rigid, or flexible material in various embodiments of the present disclosure. In some implementations, mounting element 80 can comprise a metal, metal alloy, or polymeric material, and/or combination or blend thereof. For instance, mounting element 80 can comprise a rigid or semi-rigid polymeric material configured to provide a stable and sturdy surface of attachment for the camera.

Mounting element 80 can comprise a plastic, resin, or other material or combination thereof. In at least one implementation, mounting element 80 can comprise a highly heat-conductive material. Alternatively, mounting element 80 can comprise a heat-resistant or conductivity-resistant material. In certain implementations, mounting element 80 can have a void area or gap 82. Gap 82 can provide added temperature control and/or thermal management properties. For instance, gap 82 to at least partially vent the inner chamber 15 of housing 12 relative to temperature control element (or thermal management element) 70.

Figure 4:
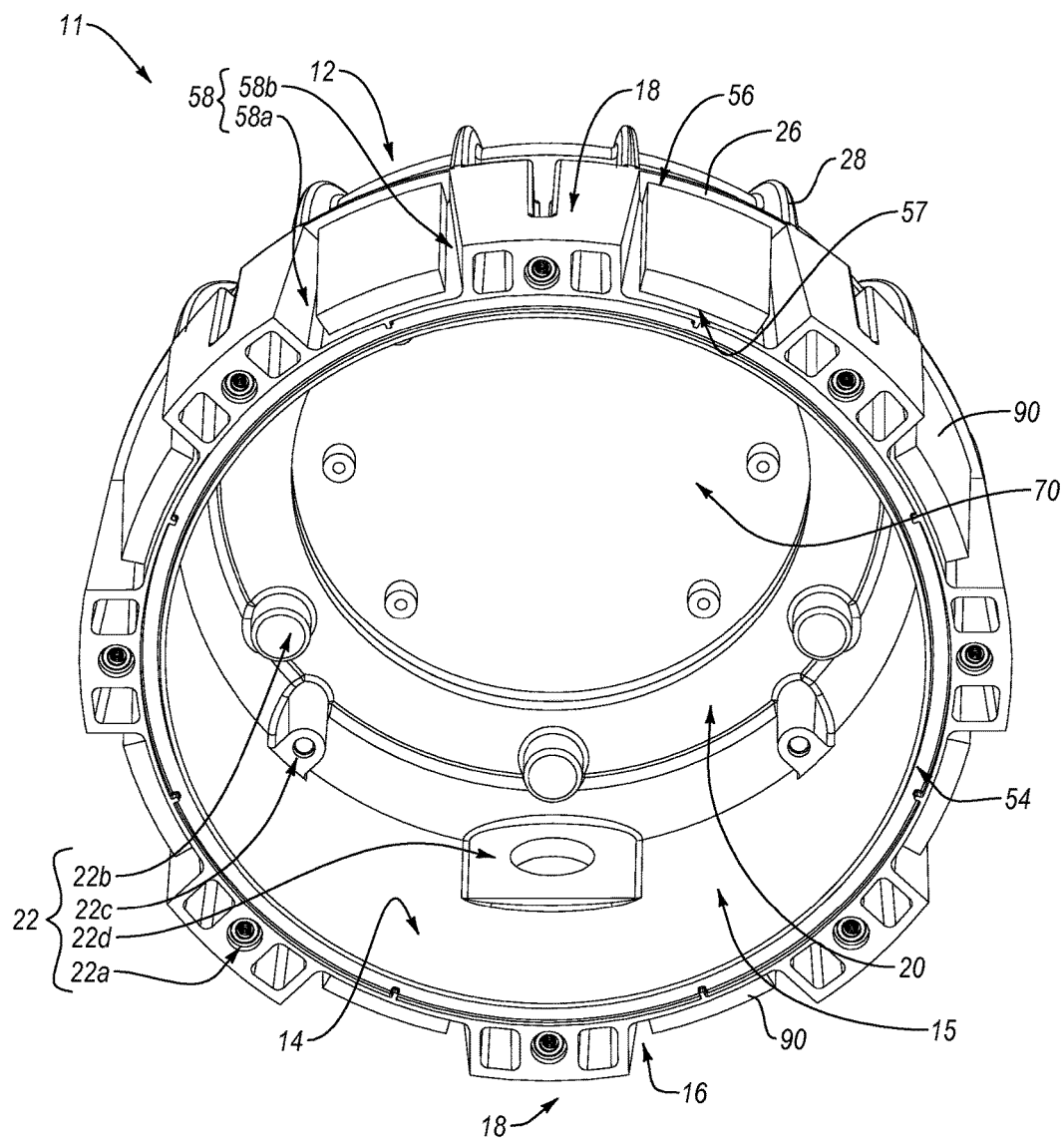
FIG. 4 illustrates a front perspective view of a housing assembly of the mounting system of FIG. 1A.

In addition, as illustrated in FIGS. 2 and 4, some implementations can include a heat path 75 (e.g., between the mounting element 80 and the temperature control element 70. Heat path 75 can comprise a void space, tube, conduit, heat pipe, or other formation that allows heat from the camera, chamber 15, and/or mounting element 80 to move to temperature control element 70. In at least one implementation, heat path 75 can enhance (active and/or passive) cooling by temperature control element 70 by allowing heat from the camera, chamber 15, and/or mounting element 80 to quickly dissipate and/or travel to temperature control element 70. In one or more implementations, for example, heat from the camera, chamber 15, and/or mounting element 80 can dissipate and/or travel more quickly through the air, gas, or other material filling and/or comprising heat path 75 (e.g., to temperature control element 70) than the same amount of heat would travel from the camera, chamber 15, and/or mounting element 80 directly to temperature control element 70.

Mounting element 80 can comprise a substantially circular configuration and/or can fit securely within compartment 15 of housing 12. In at least one implementation, mounting element 80 can have a diameter substantially similar to the inner diameter of compartment 15. One will appreciate that reference to a diameter in circular, cylindrical, spherical, dome-shaped, and/or other embodiments can be interpreted as length, width, cross-section, or other appropriate measurement in other appropriate embodiments without departing from the scope of this disclosure.

Mounting element 80 (disposed within compartment 15 of housing 12) can be secured to housing 12 (or rear wall 20 thereof) via one or more fasteners 8d. In addition, one or more openings 22 can receive a fastener 8d for connecting mounting element 80 to housing 12 or within compartment 15 thereof. For instance, in at least one implementation, fastener(s) 8d can pass through opening(s) 22g in mounting element 80 and into opening(s) 22c of housing 12 (see FIG. 4).

FIGS. 1-6 also illustrate a plurality of openings 22 configured about mounting system 10, including housing 12 and mounting assembly 13 thereof. For instance, one or more openings 22a can receive a fastener 8b for connecting covering 50 and cover securing element 60 to the front or face of housing 12 (see FIG. 1A). Likewise, one or more openings 22b (e.g., facing rearward of housing 12) can receive a fastener 8c for connecting temperature control element 70 to the back or rear of housing 12 or rear wall 20 thereof (see FIG. 1B).

One or more openings 22d can also be included to receive an adjustable base element 24 (see FIG. 2). The camera can also be at least partially disposed on or placed atop adjustable base element 24, which can be configured to adjust the positioning of the camera within compartment 15 of housing 12. For instance, adjustable base element 24 can be threadedly received in opening 22d such that rotation of adjustable base element 24 in a first direction raises adjustable base element 24 and rotation of adjustable base element 24 in an opposite direction lowers adjustable base element 24. One will appreciate, however, that other mechanisms of raising and/or lowering adjustable base element 24 are also contemplated herein.

In addition, adjustable base element 24 can comprise one or more sealing elements. In particular, the one or more sealing elements can render housing 12 (or compartment 15 thereof) water-tight, etc. Accordingly, adjustable base element 24 can be adjustable in creating a water-tight or other seal. For instance, adjustable base element 24 can comprise a cable gland for creating a seal (e.g., a water-tight seal) around one or more cables, wires, cords, etc. Illustratively, the camera disposed within housing 12 can comprise a wired camera. Accordingly, one or more power cables, wires, cords, etc. can be required to operate the camera. Adjustable base element 24 can, therefore, comprise one or more sealing elements for allowing the one or more power cables, wires, cords, etc. access to the camera, while still maintaining a water-tight or other seal between compartment 15 and the exterior thereof. Those skilled in the art will appreciate that data and/or A/V cables, including but not limited to coaxial, CAT-5, HDMI, and other cables are also contemplated herein. Furthermore, battery-powered and Wi-Fi enabled cameras are also contemplated herein.

Figure 3:
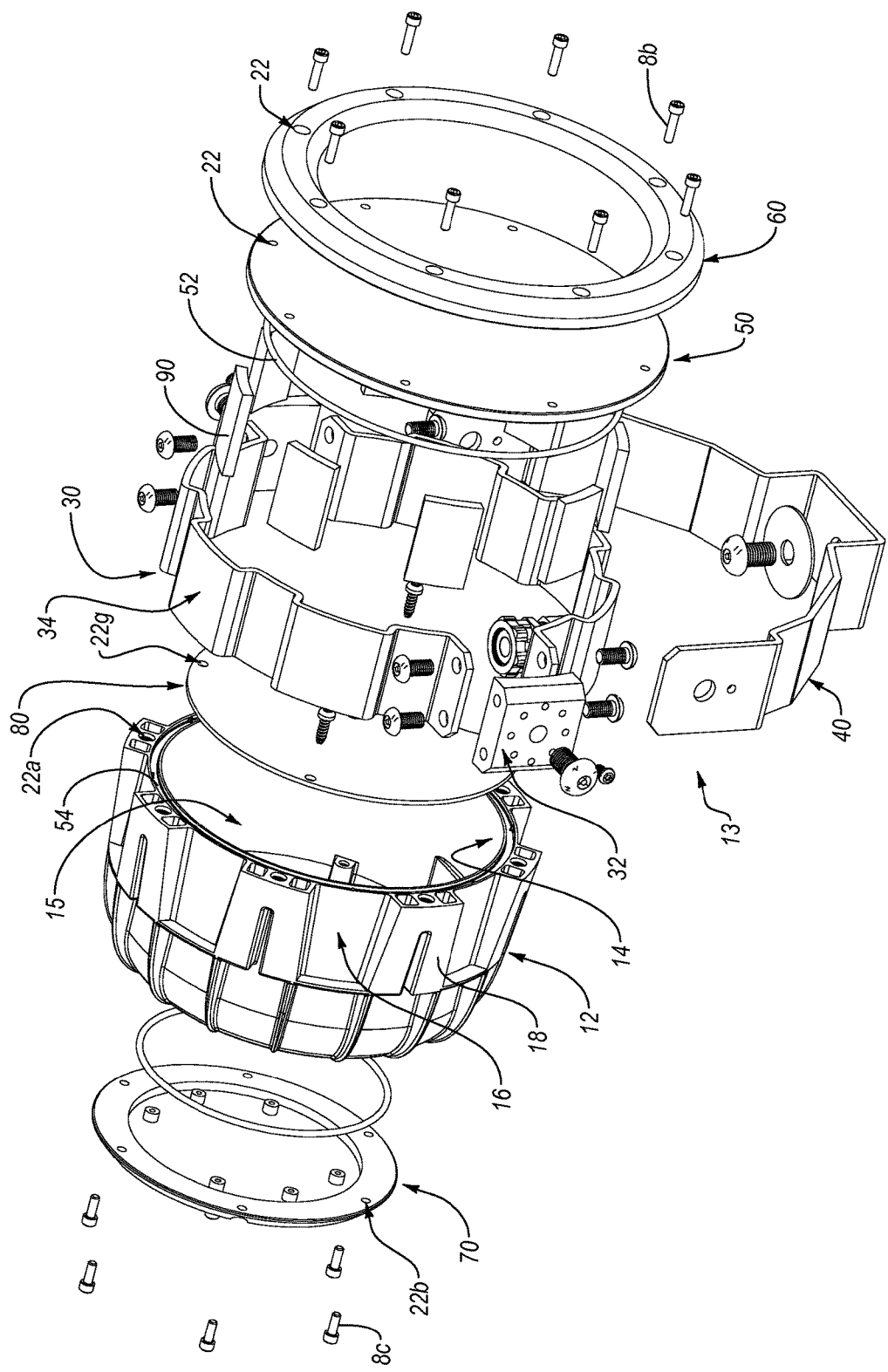
FIG. 3 illustrates an exploded front view of the mounting system of FIG. 1A.

FIGS. 3-4 further illustrate a recess 54 in the face of housing 12. Recess 54 can be configured to receive a sealing element 52, as illustrated in FIG. 2. Sealing element 52 can provide a seal between covering 50 and compartment 15 of housing 12. For instance, fasteners 8b can secure covering 50 tightly against sealing element 52 within recess 54 of housing 12 such that physical matter is precluded, prevented, impeded, obstructed, and/or inhibited, from passing into (or out of) compartment 15 (see FIG. 1A). Physical matter can include any solid, liquid, gas, or other matter, including, but not limited to, water (including mixtures of water and other matter), air (including smoke, exhaust, fog, and/or any mixture of gas and other matter), dust, dirt, particulate, mud, grease, oil, and/or any other physical matter. In at least one implementation, a sealed housing 12 can comprise an IP68 enclosure, rated against solid particle and water penetration.

Other elements of system 10 can also provide a barrier and/or resistance against such physical matter. For instance, housing 12, covering 50, temperature control element 70, and/or other components of system 10 can comprise non-porous, non-corrosive, corrosion-resistant, water-tight, water-proof, water-resistant, and/or other desirable material(s). Furthermore, elements of system 10 can provide temperature control and/or thermal management properties. For instance, housing 12, temperature control element 70, covering 50, and/or other components of system 10 can comprise heat-resistant, cold-resistant, non-conductive, conduction-resistant, bullet resistant and/or other desirable configurations and/or construction. In at least one implementation, sealing element 52 can also have temperature control and/or thermal management properties.

As illustrated in FIG. 4, shock-absorbing element 90 can be disposed at least partially within recess 16 of housing 12. In some implementations, shock-absorbing element 90 fits entirely within recess 16 of housing 12. In at least one implementation, shock-absorbing element 90 fits entirely within recess 16 of housing 12 such that one or more gaps are left between at least a portion of housing 12 and shock-absorbing element 90. For instance shock-absorbing element 90 can fit within recess 16 such that side gaps 58a, 58b are left on one or more sides of shock-absorbing element 90 (adjacent to raised elements 18 of housing 12). A rear gap 56 and/or front gap 57 can also be left between shock-absorbing element 90 and portions of housing 12 and/or mounting system 10.

Figure 5:
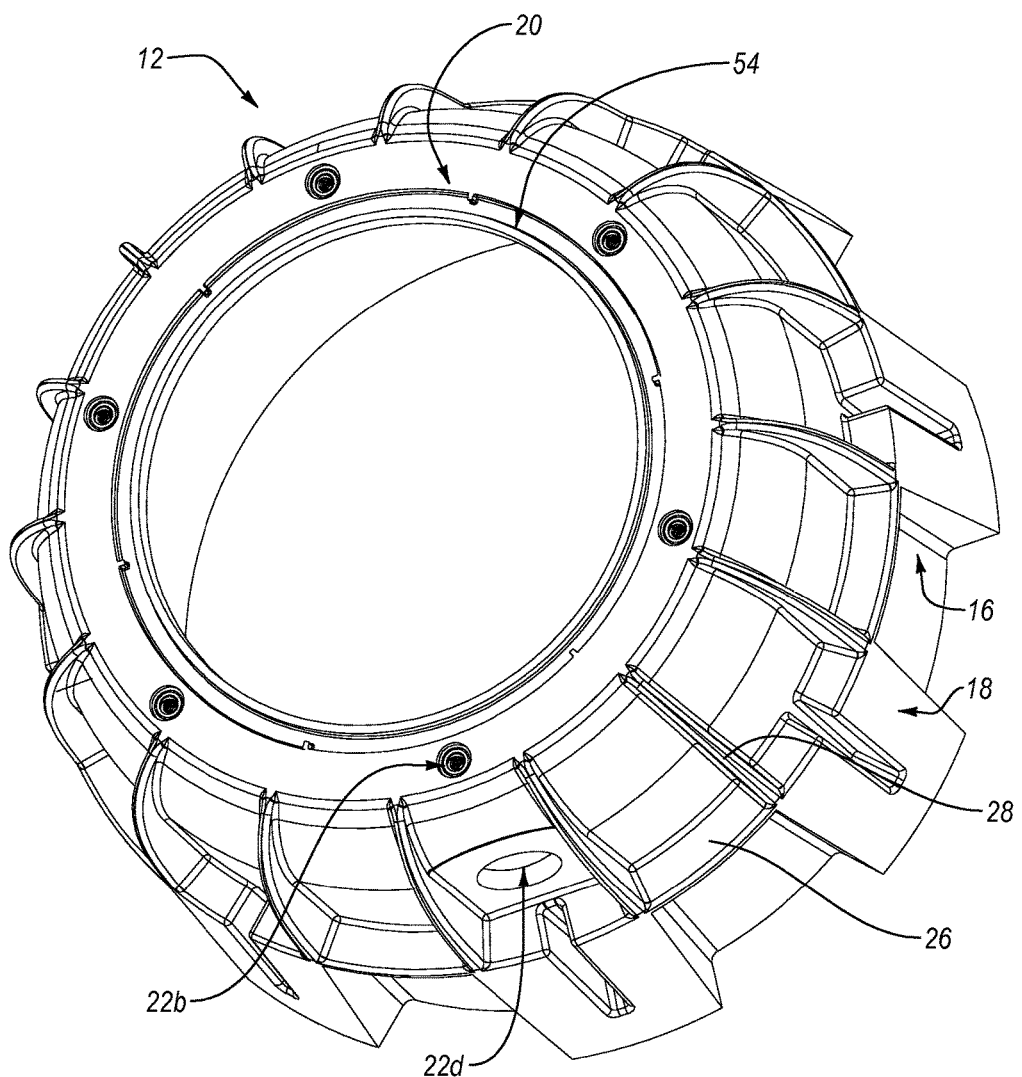
FIG. 5 illustrates a rear perspective view of the housing assembly of FIG. 4.
Figure 6:
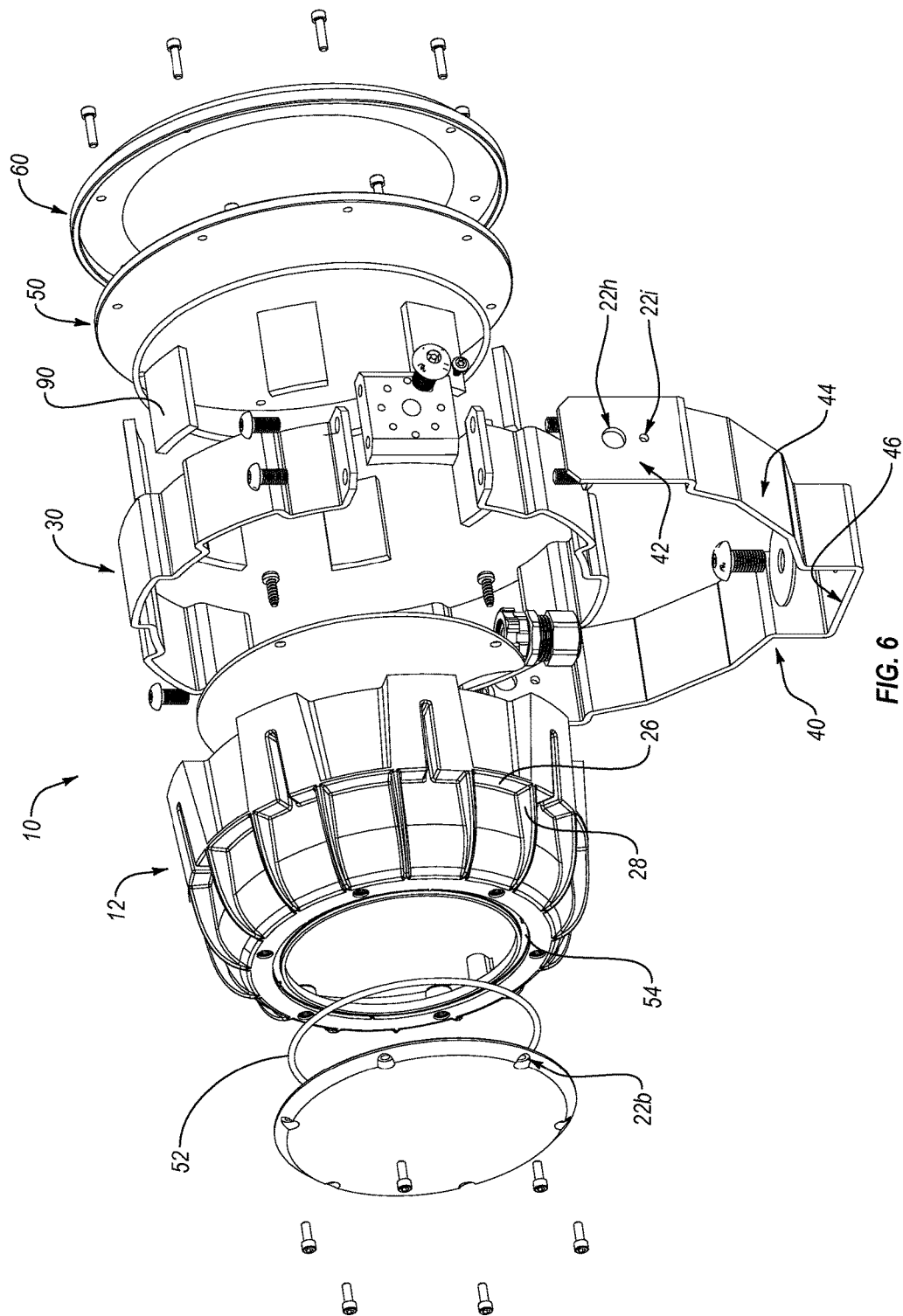
FIG. 6 illustrates an exploded rear view of the mounting system of FIG. 1A.

FIG. 5 illustrates that housing 12 can also include a second or rear opening and a recess 54 in the back side of rear wall 20. Recess 54 can also be configured to receive a sealing element 52, as illustrated in FIG. 6. Sealing element 52 can provide a seal between temperature control element 70 and compartment 15 of housing 12. For instance, fasteners 8c can secure temperature control element 70 tightly against sealing element 52 within recess 54 of housing 12 such that physical matter is precluded, prevented, impeded, obstructed, and/or inhibited, from passing into (or out of) compartment 15.

Thus, housing 12 can comprise a first or front opening and a second or rear opening. Covering 50 can be (configured to be) disposed over the first opening and temperature control element 70 can be (configured to be) disposed over the second opening. One or more sealing elements 52 can also be disposed between the housing and at least one of temperature control element 70 and covering 50. In at least one implementation, a sealed housing 12 (i.e., having the first and second openings covered and sealed) can comprise an IP68 enclosure, rated against solid particle and water penetration.

FIGS. 5 and 6 also illustrate the partial dome-like shape of housing 12. As illustrated in FIG. 5, the outside of housing 12 can include one or more recesses 16, raised members 18, barrier ridges 26, and/or support ridges 28. Recess 16 can be configured to receive one or more shock-absorbing elements 90 disposed at least partially therein (see FIG. 4). Raised members 18 can be configured to provide side walls, and barrier ridges 26 can be configured to provide a back wall to the one or more shock-absorbing elements 90 disposed at least partially within recess 16 of housing 12. Support ridges 28 can reinforce barrier ridges 26 in an elevated, raised, and/or protruding configuration.

One will appreciate that system 10 illustrates one exemplary mechanism or means for disposing shock-absorbing elements 90 on housing 12, within a recess thereof, and/or at an interface of or between housing 12 and mounting assembly 13. Other suitable mechanisms can include fastening and/or adhering shock-absorbing elements 90 to housing 12 or mounting assembly 13. Further suitable mechanisms will be or become apparent to those skilled in the art (e.g., upon practice of the disclosure).

Figure 7:
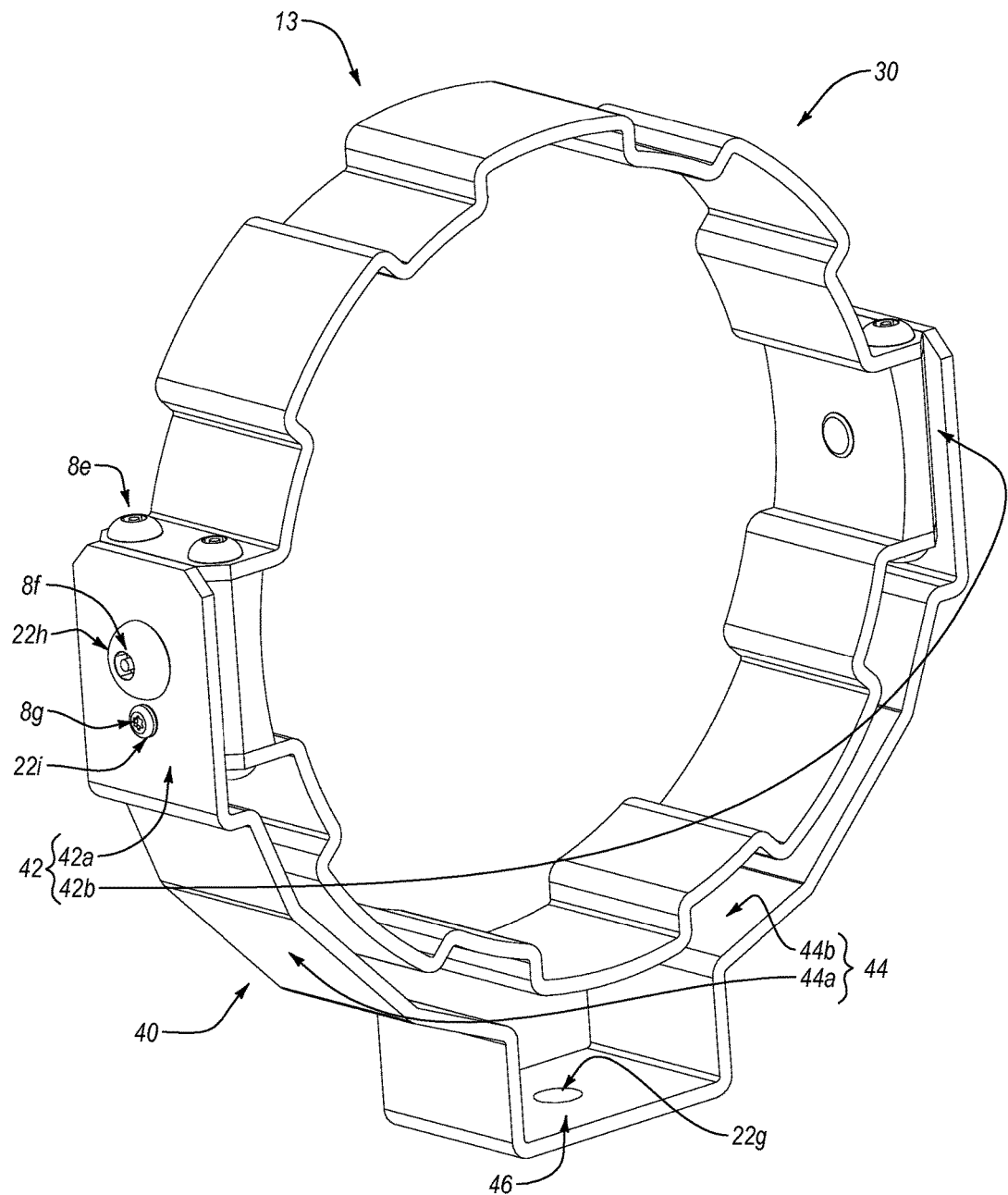
FIG. 7 illustrates a perspective view of a mounting assembly of the mounting system of FIG. 1A in a first orientation.

As noted above, mounting system 10 can also include a mounting assembly 13. As illustrated in FIG. 7, mounting assembly 13 can comprise suspension element 30 attached, connected, and/or secured to mounting bracket 40 (e.g., via fastener 8f). In some implementations, mounting assembly 13 can be attached, connected, and/or secured to a structural body and/or supporting structure (via mounting bracket 40) and/or to housing 12 (via suspension element 30). Mounting assembly 13 and/or elements thereof, can comprise a metal, metal alloy, or polymeric material, and/or combination or blend thereof.

Mounting bracket 40 can be attached, connected, and/or secured to a support structure 6 by means of fastener 8a, in certain implementations. For instance, mounting bracket 40 can be bolted to a car, boat, plane, motorcycle, bicycle, or other vehicle, any of which can comprise a support structure 6. The orientation of mounting bracket 40 can be changed by loosening or at least partially disengaging fastener 8a and rotating or turning mounting assembly 13 relative to the support structure 6 and/or about the axis of fastener 8a. Thus, mounting bracket 40 can achieve 360 degree lateral rotation in certain implementations.

One will appreciate, however, that non-bolting mechanisms of attachment are also contemplated herein and/or can achieve similar ranges of lateral rotation. For instance, fastener 8a can comprise a suction member, adhesion member, locking member, latch member, magnetic member and/or any other suitable fastener for attaching mounting bracket 40 to a support structure 6.

As illustrated in FIG. 7, mounting bracket 40 can comprise a body 44. Body 44 can comprise a substantially U-shaped, C-shaped, or V-shaped frame, comprising opposing arms 44a, 44b connected at a base 46. Base 46 can comprise and/or provide a support structure attachment element, mechanism, or means and/or an opening 22g (e.g., configured to receive a fastener 8a; see FIG. 1A-1B). Body 44 can also comprise one or more receiving elements 42 (e.g., on an upper end of body 44 (or arms 44a, 44b thereof), opposite base 46). Receiving element(s) 42 can comprise suspension element attachment elements 42a, 42b (e.g., configured to interface with a corresponding receiving element 32 of suspension element 30; see FIG. 8).

As illustrated in FIG. 7, receiving element(s) 42 (and/or suspension element attachment elements 42a, 42b thereof) can comprise one or more openings 22. In at least one implementation, receiving element(s) 42 (and/or suspension element attachment elements 42a, 42b thereof) can comprise a mounting opening 22h and an adjustment opening 22i. Mounting opening 22h can be configured to receive a fastener 8f (e.g., for securing, attaching, and/or connecting suspension element 30 to mounting bracket 40). Adjustment opening 22i can be configured to receive one or more fasteners 8g (e.g., for securing mounting bracket 40 in an orientation about suspension element 30, as described below).

Figure 8:
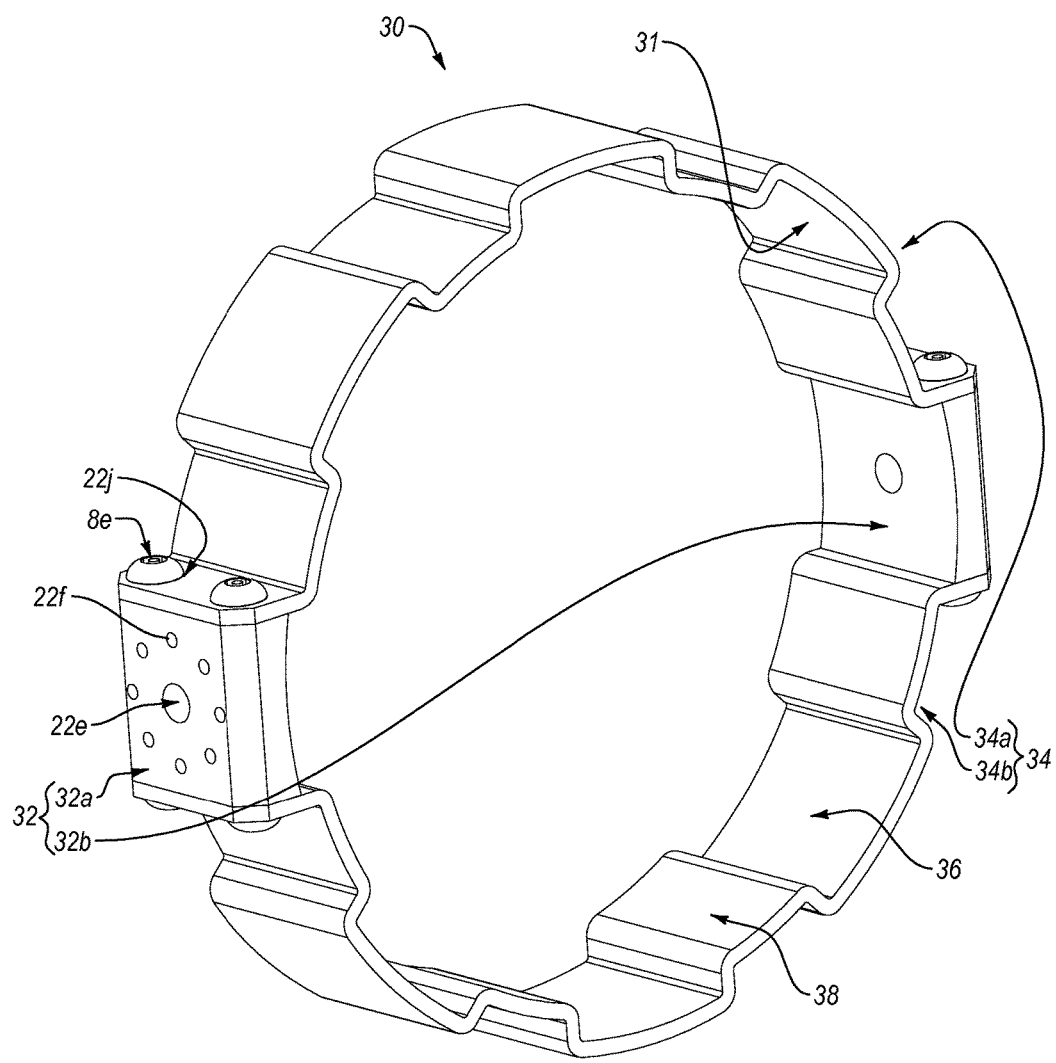
FIG. 8 illustrates a perspective view of a suspension element of the mounting system of FIG. 1A.

As illustrated in FIG. 8, suspension element 30 can comprise a body 34 having an inner surface 31. Body 34 can comprise a substantially circular, oval, rounded, and/or tubular shaped frame (e.g., comprising opposing arms 34a, 34b connected at one or more receiving elements 32). Body 34, opposing arms 34a, 34b, and/or inner surface 31 can include or comprise a structure or configuration that includes one or more inner surface recessed elements 36 and/or one or more inner surface protruding elements 38. In at least one implementation, body 34 can comprise a circular or ring-shaped structure having a continuous alternating pattern of recessed elements 36 and indents or protruding elements 38.

As indicated above, suspension element 30 can include one or more receiving elements 32 (e.g., disposed at least partially between and/or at an interface between arms 34a, 34b of body 34). Receiving elements 32 can also be attached or connected to body 34 (or arms 34a, 34b thereof) via one or more fasteners 8e (e.g., by way of opening(s) 22j). Receiving element(s) 32 can comprise mounting bracket attachment elements 32a, 32b (e.g., configured to interface with a corresponding receiving element 42 of mounting bracket 40; see FIG. 7).

Receiving element(s) 32 (and/or mounting bracket attachment elements 32a, 32b thereof) can comprise one or more openings 22. For instance, in at least one implementation, receiving element(s) 32 (and/or mounting bracket attachment elements 32a, 32b thereof) can comprise a mounting opening 22e and one or more adjustment openings 22f. Mounting opening 22e can be configured to receive fastener 8f (e.g., for securing, attaching, and/or connecting suspension element 30 to mounting bracket 40 as in FIG. 7). Adjustment openings 22f can be configured to receive one or more fasteners 8g (e.g., for securing mounting bracket 40 in an orientation about suspension element 30, as in FIG. 7 and as described below).

Figure 9:
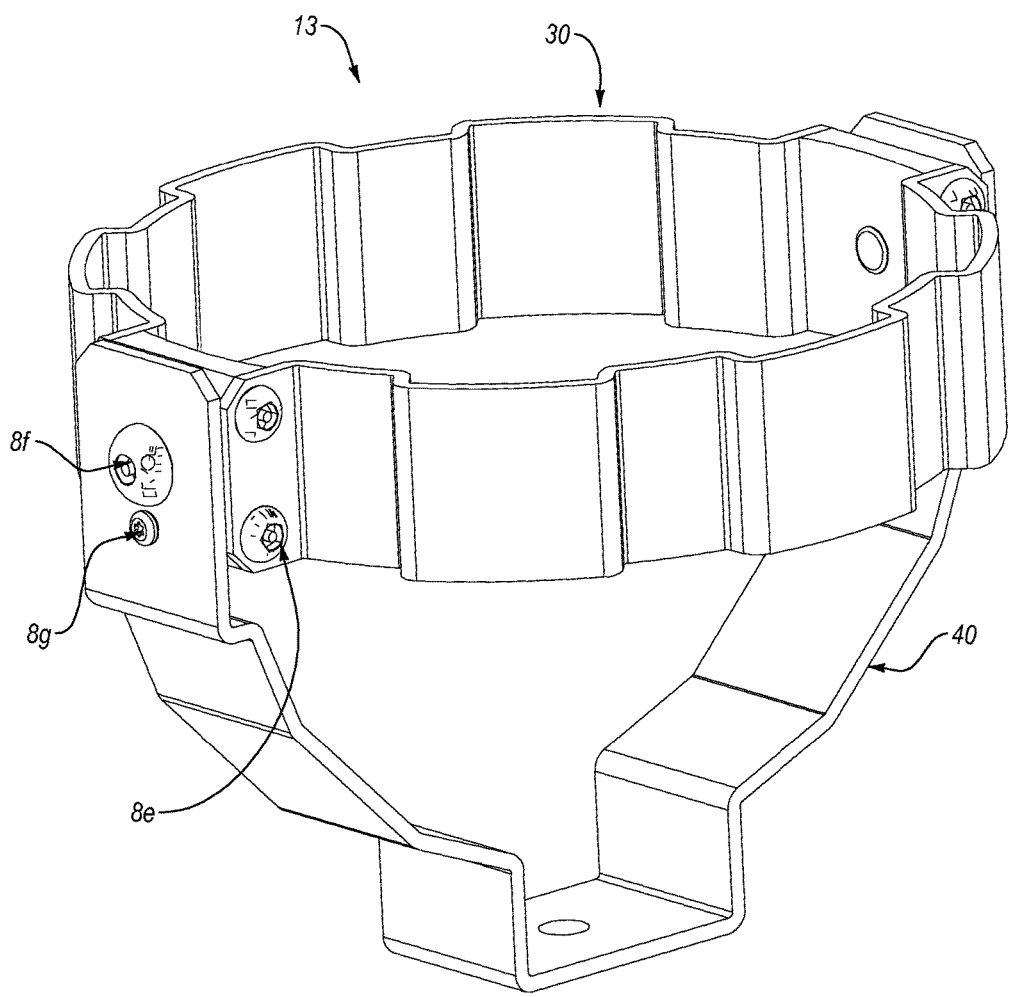
FIG. 9 illustrates a perspective view of the mounting assembly of FIG. 6 in a second orientation.

As illustrated in FIG. 9, the orientation of mounting bracket 40 relative to suspension element 30 can be selectively changed (e.g., on demand). For instance, in an illustrative implementation, the orientation of mounting bracket 40 can be aligned with (e.g., parallel to) the orientation of suspension element 30 (e.g., as in FIG. 7). The orientation of mounting bracket 40 can also be transverse to (e.g., perpendicular to) the orientation of suspension element 30 (e.g., as in FIG. 9). The orientation of mounting bracket 40 relative to the orientation of suspension element 30 can also be greater than, less than, or equal to 90 degrees (i.e., any orientation between parallel and perpendicular as illustrated in FIGS. 7 and 9, respectively). In certain implementations, fastener 8g can secure mounting bracket 40 in any suitable orientation relative to suspension element 30.

The relative orientations of mounting bracket 40 and suspension element 30 have a practical effect during use of mounting system 10. For instance, a user can mount or connect mounting system 10 to a support structure 6 (via mounting bracket 40), and subsequently adjust the orientation of suspension element 30 relative to mounting bracket 40 by loosening and/or disengaging fastener 8g (e.g., from opening 22f) and rotating, turning, and/or swiveling suspension element 30 relative to mounting bracket 40. As the orientation of suspension element 30 is altered, the orientation of housing 12 (and the camera received therein) is also changed. Thus, the camera can be tilted (e.g., up and down) by loosening and/or disengaging fastener 8g and adjusting suspension element 30. Upon reaching a desired orientation, fastener 8g can be tightened and/or engaged to secure suspension element 30 in the new orientation.

In some implementations of the present disclosure, shock-absorbing elements 90 can be disposed and/or positioned at the interface between housing 12 and mounting assembly 13. In particular, shock-absorbing elements 90 can be disposed and/or positioned at the interface between housing 12 and suspension bracket 30. In at least one implementation, one or more shock-absorbing elements 90 can also be positioned at the interface between receiving element 32 of suspension element 30 and mounting bracket 40 (e.g., receiving elements 42 thereof). Shock-absorbing element 90 can comprise any suitable material (or combination thereof) configured to absorb, dissipate, and/or receive a force applied thereto. Thus, shock-absorbing element 90 can comprise a cushion, pad, spring, shock, suspension, coil, gel, and/or any other shock-absorbing material. In at least one implementation, shock-absorbing elements 90 can comprise an isolation pad configured to separate housing 12 from at least a portion of mounting assembly 13 (and/or suspension element 30 thereof).

As used herein, a force can comprise any movement or motion, including, but not limited to, jarring, jolting, shaking, shocking, rocking, bouncing, bumping, thumping, pushing, and/or vibrating. The force (e.g., vibration) can originate from one or more sources. For instance, mounting system 10 can be attached to a land vehicle, watercraft, aircraft, or other (motorized) vehicle. Accordingly, engine-generated vibrations, vehicle movement-generated vibrations (e.g., from land, road, bridge, water, air, wind, etc.), and/or other forms of vibration, etc. can apply force(s) and/or cause force(s) to be applied to the mounting system 10. Similarly, mounting system 10 can be attached to a non-motorized, stationary, portable, or other object, including one or more buildings, poles, articles of clothing, gear, or equipment, and/or any other suitable object. Accordingly, various forces from one or more sources (e.g., seismic activity, movement, wind, rain, thunder, acoustics, waves, etc.) can be applied to the mounting system 10.

In addition, the vibration or other force can be applied to mounting system 10 at one or more specific frequencies. For instance, mounting system 10 can be exposed to motor or engine-generated vibration frequencies, dirt or paved road (including bridge) generated frequencies, and/or water, air, wind, and/or other force-generated frequencies. In at least one implementation, the frequency (of vibration or other force) can be less than or equal to 100 Hz. For instance, the frequency can be less than 10 Hz, between 10 Hz and 100 Hz, between 25 Hz and 50 Hz, and/or any value or range of values included therein. In at least one implementation, the frequency (of vibration or other force) can be greater than 100 Hz. For instance, the frequency can be greater than 1000 Hz, between 100 Hz and 1000 Hz, between 250 Hz and 500 Hz, and/or any value or range of values included therein. Frequencies over 1000 Hz are also contemplated herein.

Thus, shock-absorbing element 90 can be configured to absorb, dissipate, and/or receive a force of any type disclosed herein or otherwise known to those skilled in the art. In particular, shock-absorbing element 90 can be configured to absorb, dissipate, and/or receive a force applied to mounting assembly 13 (or portion(s) thereof) such that the amount of force applied to housing 12 is less than the amount of force applied to mounting assembly 13.

Without being bound to theory, the amount of force applied on a system is known to be the product of the mass of the object applying the force, and the acceleration of that object relative to the object to which the force is applied. Accordingly, shock-absorbing element 90 can be configured to absorb, dissipate, and/or receive a force and reduce the amount of force applied to housing 12 by reducing the acceleration experienced by housing 12 in response to the applied force.

As illustrated in FIGS. 10A-10C, temperature control element 70 can comprise a thermally conductive disk 72 having a planar body 74. One will appreciate, however, that temperature control element 70 can comprise other configurations, structures, devices, apparatus, and/or elements without departing from the scope of this disclosure. For instance, temperature control element 70 can comprise a device or apparatus having mechanical, electronic, magnetic, and/or other parts, elements, features, and/or members.

In at least one implementation, thermally conductive disk 72 comprises one or more materials configured to selectively dissipate heat in one or more directions. For instance, thermally conductive disk 72 can be configured to dissipate heat at a higher rate in an in-plane direction 76 than in a through-plane direction 78, relative to planar body 74 (see FIG. 10C). In an illustrative implementation, the through-plane thermal conductivity of thermally conductive disk 72 can be up to 10-fold less than the in-plane conductivity. For instance, the thermal conductivity of thermally conductive disk 72 can be between 0.1 and 10 Watts per meter Kelvin (W/mK) in the through-plane direction 78 and between 10 and 100 W/mK in the in-plane direction 76, between 0.5 and 5 W/mK in the through-plane direction 78 and between 5 and 50 W/mK in the in-plane direction 76, between 0.75 and 3 W/mK in the through-plane direction 78 and between 7.5 and 30 W/mK in the in-plane direction 76, between 1 and 2 W/mK in the through-plane direction 78 and between 10 and 20 (or between 15 and 20) W/mK in the in-plane direction 76, and/or any amount or range therebetween, including ranges up to, less than, and/or including the foregoing amounts.

Thus, without being bound to theory, while most plastics are continuously conductive throughout the material, independent of the design or how it is molded, or the direction of heat dissipation (e.g., thermal conductivity of most plastics is very low) thermally conductive disk 72 can have or exhibit variable thermal conductivity. The variable thermal conductivity properties of thermally conductive disk 72 can arise at least in part from the material(s), method(s), and/or mode(s) of manufacturing, designing, and/or fabricating thermally conductive disk 72. For instance, thermally conductive disk 72 can include a fiber filler that is directionally oriented in the same direction as the manufacturing process (extrusion).

In one or more implementations, a manufacturer can inject plastic into a mold, and the filler fibers combined with the plastic can become aligned and/or oriented in the direction of flow. The filler fibers can comprise carbon, graphite, or any other suitable fiber or molecule and/or can (substantially) increase the thermal (conductivity) properties of the (plastic) material (e.g., in one or more directions, including the direction of flow or injection, the in-plane direction, and/or the through-plane direction). Thermally conductive disk 72 can also exhibit corrosion-resistant or corrosion-free properties (e.g., unlike metal counterparts).

Accordingly, the material(s) used in the formation of thermally conductive disk 72 can be tuned in the mixing, manufacturing, and/or injection process to optimize the thermal conductivity properties thereof. Furthermore, an individual can request specific parameters (including thermal conductivity in the through-plane and/or in-plane directions) for the desired thermally conductive disk 72 before it is produced and/or injection molded. For instance, additional filler and/or changes in the ratio of filler to plastic can change the relevant properties of the disk 72.

In addition, various parameters, including the rate and/or magnitude of injection molding, heating, cooling, extruding, and/or pressurizing the injectable material(s) can be altered to change the thermal properties of thermally conductive disk 72. In at least one implementation, parameters can be varied in order to optimize the alignment and/or orientation of the filler material (e.g., carbon and/or graphite) and/or the carrier material (e.g., plastic). The shape and size of the disk 72 can also be altered to adjust and/or tune the thermal properties thereof.

Temperature control element 70 can modulate or enhance the temperature control or thermal management within housing 12. For example, temperature control element 70 can ensure that compartment 15 of housing 12 (and/or the camera disposed therein) remains cool in hot environments and/or warm in cold environments. In at least one implementation, thermally conductive disk 72 can cool compartment 15 to prevent over-heating of the camera disposed therein. In at least one implementation, thermally conductive disk 72 can dissipate heat from the ambient environment outside compartment 15 and/or from sensitive electronics within compartment 15 such that the camera does not overheat. For instance, thermally conductive disk 72 can prevent and/or act as an insulator against solar loading by dissipating heat to a higher degree within the body 74 of disk 72 than through the body 74 of disk 72. Thus, the thermal conductivity of system 10 and/or thermally conductive disk 72 can be engineered to allow internal cooling in hot environments and/or internal heat build-up in cold environments.

Illustratively, if compartment 15 of the camera housing 12 (and/or the camera disposed therein) is cool relative to the ambient, outside temperature, the rate at which the internal temperature of compartment 15 changes (and/or raises) can be slowed because the rate of thermal conductivity of disk 72 can be controlled. On the contrary, a material that has the same in-plane and through-plane conductivity may lack the thermal management properties of disk 72 and/or temperature control element 70. Thus, the difference in through-plane and in-plane conductivity in disk 72 can be advantageous and/or exploited for thermal management of system 10. In at least one implementation, disk 72 and/or temperature control element 70 can provide and/or control thermal management (e.g., of the entire system 10) even though the feature or element is only provided in one area (e.g., mounted, attached, and/or connected to the back of rear wall 20).

Some implementations of the present disclosure can include a plurality of temperature control elements 70, including one or more thermal management elements, heating elements, heat generating elements, radiators, heating coils, heat conducting elements, thermally conductive elements, heat dissipating elements, heat extractors, electronic Peltier members, fans, air flow management element, ventilation elements, cooling elements, cooling modules, cool air ventilating elements, and/or air conditioners.

Certain implementations can include a kit comprising a one or more temperature control elements 70, including one or more of a variety of interchangeable thermal management or other modules for selectively heating and/or cooling the camera. For instance, a heating kit can comprise one or more temperature control elements 70 for keeping compartment 15 of housing 12 (and/or the camera disposed therein) warm in cold environments (e.g., during winter or refrigerated settings). A cooling kit can comprise one or more temperature control elements 70 for keeping compartment 15 of housing 12 (and/or the camera disposed therein) cool in hot environments (e.g., during summer or heated settings). In at least one implementation, kits can be provided in an interchangeable configuration such that one or more temperature control elements 70 can be swapped to provide a modular and/or multi-functional system. For instance, fastener(s) 8c can be universal to a plurality of the interchangeable temperature control elements 70.

Thus, system 10 can also comprise a customizable thermal management system for mounting a camera to a support structure 6. System 10 can comprise seasonally customizable and/or field upgradeable features and elements that can be interchangeable for quick, easy, and/or convenient alteration of the system depending on the immediate and sometimes changing needs and/or demands of the user and/or environment. System 10 can also provide a cost effective solution to hot, warm, cool, and cold weather image capturing by providing interchangeable options for regulating temperature of the camera.

It will be appreciated that various features, members, elements, parts, and/or portions of certain embodiments of the present disclosure, including devices, products, apparatus, methods, etc., are compatible with and/or can be combined with, included in, and/or incorporated into other embodiments of the present disclosure. Thus, disclosure of certain features, members, elements, parts, and/or portions relative to a specific embodiment of the present disclosure should not be construed as limiting application or inclusion of said features, members, elements, parts, and/or portions to the specific embodiment. Rather, it will be appreciated that other embodiments can also include said features, members, elements, parts, and/or portions without necessarily departing from the scope of the present disclosure.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein for purposes of illustrating the invention, it will be apparent to those skilled in the art that various changes in the methods, products, devices, and apparatus disclosed herein may be made without departing from the scope of the invention, which is defined in the appended claims. All changes which come within the meaning and range of equivalency of the claims are to be embraced within their scope.

We claim:

1. A camera mounting system, comprising:
   a housing configured to receive a camera, the housing having a first opening defining an optical axis;
   a mounting assembly comprising a suspension element connected to the housing at a first interface and a mounting bracket attachable to a surface of a support structure at a second interface; and
   one or more shock-absorbing elements disposed at least partially between the suspension element and the housing at the first interface;
   wherein an orientation of at least a portion of the mounting system is pilotable such that the angle of the optical axis relative to the surface of the support structure is selectively adjustable;
   wherein:
   the one or more shock-absorbing elements are configured to at least partially isolate the housing from direct impact of a force applied to the mounting assembly, the housing being under suspension relative to the suspension element such that a gap is disposed between at least a portion of the housing and at least a portion of the suspension element at the interface, the one or more shock-absorbing elements being disposed at least partially in the gap such that at least in a resting configuration, the housing does not directly contact the suspension element;
   the housing has an outer surface comprising a plurality of protruding elements disposed radially about the outer surface, the plurality of protruding elements forming a plurality of recesses disposed between the plurality of protruding elements; and
   the suspension element has an inner surface comprising a plurality of protruding elements corresponding to the plurality of recesses of the outer surface of the housing and a plurality of recesses corresponding to the plurality of protruding elements of the outer surface of the housing.

2. The camera mounting system of claim 1, wherein the mounting bracket includes an attachment mechanism for selective rotational attachment to the surface of the support structure.

3. The camera mounting system of claim 1, wherein, at least in a resting configuration, the housing does not directly contact the suspension element.

4. The camera mounting system of claim 1, wherein the one or more shock-absorbing elements are disposed at least partially between the plurality of recesses of the outer surface of the housing and the plurality of protruding elements of the inner surface of the suspension element or at least partially between the plurality of protruding elements of the outer surface of the housing and the plurality of recesses of the inner surface of the suspension element.

5. The camera mounting system of claim 4, wherein, at least in the resting configuration, the one or more shock-absorbing elements prevent direct contact between one or more of:
   the plurality of recesses of the outer surface of the housing and the plurality of protruding elements of the inner surface of the suspension element; and
   the plurality of protruding elements of the outer surface of the housing and the plurality of recesses of the inner surface of the suspension element.

6. The camera mounting system of claim 1, wherein the housing comprises an injection molded polymeric material and the mounting assembly comprises a metal or metal alloy.

7. The camera mounting system of claim 1, wherein the housing has an inner surface at least partially bounding a compartment configured to receive the camera therein, the camera mounting system further comprising:
   a mounting element disposed at least partially within the compartment and configured to have the camera connected thereto; and
   a temperature control element connected to the housing, the temperature control element being configured to regulate a temperature inside the compartment to thereby regulate the temperature of the camera disposed therein.

8. The camera mounting system of claim 7, wherein the temperature control element comprises a thermoelectric device selected from the group consisting of one or more thermoelectric coolers, thermoelectric heaters, thermal management elements, heating elements, heat generating elements, radiators, heating coils, heat conducting elements, thermally conductive elements, heat dissipating elements, heat extractors, electronic Peltier members, fans, air flow management element, ventilation elements, cooling elements, cooling modules, cool air ventilating elements, air conditioners, electronic devices that becomes hot on one side a cool on the other when power is applied, and combinations thereof.

9. The camera mounting system of claim 7, wherein the temperature control element comprises a thermally conductive element comprising at least polymeric material and at least one thermally conductive molecule.

10. The camera mounting system of claim 9, wherein the thermally conductive element comprises at least one injection molded planar member comprising a mixture of polymeric molecules and thermally conductive carbon or graphite molecules, wherein the thermally conductive carbon or graphite molecules are oriented relative to a plane of the planar member such that the thermally conductive element exhibits a first thermal conductivity in an in-plane direction and a second thermal conductivity in a through-plane direction.

11. The camera mounting system of claim 10, wherein the thermal conductivity in the in-plane direction is greater than the thermal conductivity in the through-plane direction.

12. The camera mounting system of claim 11, wherein the thermal conductivity in the through-plane direction is less than 10 W/mK and the thermal conductivity in the in-plane direction is between 10 W/mK and 100 W/mK.

13. The camera mounting system of claim 12, wherein the thermal conductivity in the through-plane direction is less than 5 W/mK and the thermal conductivity in the in-plane direction is between 15 W/mK and 20 W/mK.

14. The camera mounting system of claim 13, wherein the thermal conductivity in the through-plane direction is between 1 and 2 W/mK.

15. A camera mounting kit, comprising:
   a housing having an inner surface at least partially bounding a compartment, the compartment configured to receive a camera therein;

a mounting assembly configured to be connected to the housing at an interface such that a gap is disposed between at least a portion of the housing and at least a portion of the mounting assembly at the interface;

one or more shock-absorbing elements configured to be disposed at least partially between the mounting assembly and the housing such that the one or more shock-absorbing elements prevent direct contact between at least a portion of the housing and at least a portion of the mounting assembly and allow for the housing to move relative to the mounting assembly; and one or more removable temperature control elements connected to the housing, the one or more temperature control elements being configured to regulate a temperature inside the compartment to thereby regulate the temperature of the camera disposed therein, wherein:

the one or more shock-absorbing elements are configured to at least partially isolate the housing from direct impact of a force applied to the mounting assembly, the housing being under suspension relative to the suspension element such that a gap is disposed between at least a portion of the housing and at least a portion of the suspension element at the interface, the one or more shock-absorbing elements being disposed at least partially in the gap such that at least in a resting configuration, the housing does not directly contact the suspension element;

the housing has an outer surface comprising a plurality of protruding elements disposed radially about the outer surface, the plurality of protruding elements forming a plurality of recesses disposed between the plurality of protruding elements; and the suspension element has an inner surface comprising a plurality of protruding elements corresponding to the plurality of recesses of the outer surface of the housing and a plurality of recesses corresponding to the plurality of protruding elements of the outer surface of the housing.

16. The camera mounting kit of claim 15, wherein the one or more removable temperature control elements comprise a plurality of interchangeable temperature control elements.

17. The camera mounting kit as recited in claim 15, wherein the one or more shock-absorbing elements are disposed at least partially between the plurality of recesses of the outer surface of the housing and the plurality of protruding elements of the inner surface of the suspension element or at least partially between the plurality of protruding elements of the outer surface of the housing and the plurality of recesses of the inner surface of the suspension element.

18. The camera mounting kit as recited in claim 17, wherein, at least in the resting configuration, the one or more shock-absorbing elements prevent direct contact between one or more of:
the plurality of recesses of the outer surface of the housing and the plurality of protruding elements of the inner surface of the suspension element; and
the plurality of protruding elements of the outer surface of the housing and the plurality of recesses of the inner surface of the suspension element.

19. The camera mounting kit as recited in claim 15, wherein the one or more cooling elements comprise one or more elements selected from the group consisting of:
thermally conductive elements, thermoelectric coolers, thermal management elements, radiators, thermally conductive elements, heat dissipating elements, heat extractors, electronic Peltier members, ventilation elements, cooling elements, cooling modules, cool air ventilating elements, air conditioners, and one or more electronic devices that become hot on one side and cool on the other when power is applied, and combinations thereof.

* * * * *